United States Patent [19]

Chiu

[11] 4,377,187
[45] Mar. 22, 1983

[54] LIQUID SMOKE IMPREGNATED FIBROUS FOOD CASING

[75] Inventor: Herman S. Chiu, Chicago, Ill.

[73] Assignee: Union Carbide Corporation, Danbury, Conn.

[21] Appl. No.: 301,275

[22] Filed: Sep. 11, 1981

[51] Int. Cl.³ .............. D03D 13/00; A22C 13/00; A23L 1/22
[52] U.S. Cl. .............. 138/118.1; 426/90; 426/105; 426/129; 426/250; 426/315; 426/534; 426/650; 428/36
[58] Field of Search .............. 138/118.1; 428/36; 427/434.2, 439; 426/90, 92, 105, 129, 250, 268, 315, 534, 538, 650

[56] References Cited

U.S. PATENT DOCUMENTS

| 3,330,669 | 7/1967 | Hollenbeck | 426/302 |
| 3,360,383 | 12/1967 | Rose et al. | 426/135 |
| 4,104,408 | 8/1980 | Chiu | 426/135 |
| 4,174,368 | 11/1979 | Chiu | 264/561 |
| 4,196,220 | 4/1980 | Chiu et al. | 426/105 |

FOREIGN PATENT DOCUMENTS 151768  9/1950  Australia.
1099326  2/1961  Fed. Rep. of Germany.

OTHER PUBLICATIONS

"Bactericidal Effect of Charsol on Meat Spoilage Organisms", Distributed at Red Arrow Products Corp., Symposium on Smoke & Smoke Flavoring, Manitowac, WI, Aug. 5, 1981, (5 pages).
"Bactericidal and Fungicidal Properties of Smoke Solutions", I. L. Wolkowskaja and I. I. Lapszin, Politechnika Gbanska, Poland, Nov. 11-15, 1960, (3 pages), (Distributed at 2nd Intl. Session of Smoke Curing Processes).
Red Arrow Products Co., Smoke Flavoring Directory, (1979).
"Antimicrobial Activity of Non-Halogenated Phenolic Compounds", P. M. Davidson & A. L. Brandon, Journal of Food Protection, vol. 44, No. 8, pp. 623-632, (Aug. 1981).

Primary Examiner—William R. Dixon, Jr.
Attorney, Agent, or Firm—Real J. Grandmaison; John C. Lefever

[57] ABSTRACT

Fibrous reinforced cellulosic food casing with wood-derived liquid smoke having smoke color, odor and flavor constituents, impregnated in the casing wall to provide an absorptive index of at least about 0.15 and moisture content of between about 17% and about 60% by weight of total casing.

20 Claims, 4 Drawing Figures

FIG. I

LIQUID SMOKE IMPREGNATED FIBROUS FOOD CASING

BACKGROUND OF THE INVENTION

1. Related Application

Application Ser. No. 301,276, entitled "Liquid Smoke-Impregnation of Fibrous Casings", filed contemporaneously with this application in the name of Herman S-G. Chiu, incorporated herein by reference.

2. Field of the Invention

This invention relates to a liquid smoke-impregnated food casing of the fibrous reinforced cellulosic type.

Surface appearance, odor and flavor are important factors in the commercial and consumer acceptance of processed meat products, and a common feature of most varieties of such products involves the use of "smoking" for imparting characteristic flavor, odor and color thereto. The "smoking" of food products has been generally accomplished by subjecting the foot product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of aqueous solutions of wood-derived smoke constituents, commonly called "liquid smoke solutions", in the processing of many types of meat and other food products.

The application of "liquid smoke solutions" to meat products is generally carried out in a variety of ways, including spraying or dipping an encased food product during the processing thereof, but this is not completely satisfactory because of inability to uniformly treat the encased product. Another method is to incorporate the liquid smoke solution in the recipe itself, but this does not always provide the desired surface appearance because of dilution of smoke ingredients. Also, incorporation of liquid smoke in the recipe reduces the stability of the meat emulsion, and will adversely affect taste if high concentrations are used. Spray or dip application of liquid smoke to encased food products also causes unwanted pollution and equipment corrosion problems for the food processor. In addition, encased foodstuffs treated by application of the liquid smoke during commercial processing have been found to yield sausages which are lacking in smoke color uniformity between different sausages from the same processed group. Even more undesirable is the lack of color uniformity which often appears on the surface of the same sausage, such as light and dark streaks or blotches, and even uncolored spots, particularly at the sausage ends.

It has been found that casings affording special treatment or structural characteristics to the food product can be more uniformly and economically supplied by the casing manufacturer. Accordingly, it would be desirable for the casing manufacturer to provide a liquid smoke-impregnated casing which could be used by the food processor to impart smoke flavor, odor and color to the food outer surface after stuffing in the casing and during the elevated temperature processing of the encased product.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of wood, that is, the breakdown or cracking of the wood fibers into various compounds which are distilled out of the wood char residue. Aqueous liquid smokes are generally very acidic, usually having a pH of 2.5 or less and a titratable acidity of at least 3%.

Reference to the term "smoke color, odor and flavor constituents", as used throughout this specification with respect to liquid smoke compositions and the liquid smoke-impregnated casing article of this invention, is intended to refer to, and should be understood as referring to, the smoke coloring and flavoring and odor constituents derived from liquid smoke solutions in their commercially available form.

The liquid smoke used to prepare the article of this invention is derived from natural wood smoke constituents. The source liquid smoke is generally produced by the limited burning of hardwoods and the adsorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturer of the liquid smoke are absorbed into the solution in a balanced proportion and the undesirable constituents may be removed. The resultant liquid smoke solution still contains a significant concentration of tars, because the manufacturers and users of the liquid smoke consider the dark colored tars to be necessary from the standpoint of imparting smoke color, odor and flavor to foodstuffs.

Smoke treatment is quite expensive, and it has been assumed in the meat packing industry that to achieve the darker smoke color characteristic on the surface of a meat product, the encased meat product must be subjected to a more extensive treatment with smoke. This has typically been accomplished by increasing the treatment temperature, the contacting time, or the concentration of the liquid smoke, all of which result in increasing processing cost.

The casing articles of this invention are tubular in form, and of the cellulosic type. Also, these casings require a fibrous reinforcement in the casing wall in order to provide for dimensional stability when the casing is impregnated with liquid smoke and to provide dimensional uniformity when the casing is stuffed with a foodstuff. It has been found that cellulosic casing which is subjected to the same liquid smoke treatment level but which does not have a fibrous web in the casing wall, becomes dimensionally irregular in the treatment process and lacks dimensional uniformity in the stuffing process. Accordingly, the casings useful in the present invention are the fibrous reinforced cellulosic type. Generally, these fibrous casings are used to produce encased foodstuffs having a stuffed diameter in the range of from about 40 mm to about 160 mm, or even higher.

In the preparation and use of fibrous cellulosic food casings, the moisture content of the casings is of considerable importance. By way of non-limiting illustration, the casings may be shirred, ie. compressed into a tightly compacted and pleated form, before stuffing on a machine which first deshirrs a casing "stick" and then stuffs the inflated casing. To facilitate shirring operations on these casings without damaging them, it is generally necessary that they be of relatively low water content, usually in the range of from about 11% to about 17% by weight of total casing, a moisture content which is relatively low compared to the moisture content required when the casing is used for food stuffing. To permit shirred casing to be stuffed without breaking of the casing during the stuffing operation, shirred fibrous casings having an average moisture content of between about 17% to about 35% are required. This lower limit of moisture content is important during stuffing, because excessive breakage of the casing has been found to occur at lower moisture contents.

Here it is of importance to note that the term "moisture content" as used throughout this specification and in the appended claims with reference to the liquid smoke smoke-impregnated fibrous cellulosic casing articles of the invention, is intended to refer to and should, unless otherwise specified, be understood as referring to: the weight percent of water or moisture in the casing based on the total weight of the casing.

Even if large size casings are to be used in the flattened form for stuffing without conversion to the shirred stick form, such large size casings are quite stiff in the dry stock form, and are softened for stuffing operation by soaking in water, usually for about an hour, resulting in full moisture saturation of the casing to about 60% by weight of the total casing. Because of this full saturation soaking just prior to use in stuffing operations, the need to supply such casings with any predetermined controllably added moisture content for stuffing operations has not been necessary or even advantageous. The recent wider use of automatic high speed high pressure stuffing equipment for products employing large size tubular food casings, and the consequent increased demand for such casings in shirred form as compared to the short, flattened lengths heretofore used, has brought focus to bear on and has emphasized the problems of moisturizing such casings by soaking just prior to use. Moreover, the need for greater control of all aspects of the manufacture and use of large size food casings has been and is increasing. For example, the uniformity of dimensions of stuffed food casings and food products processed therein has become an increasingly important commercial requirement, and casing moisture content has been found to be a factor in control of uniformity, as well as in meeting the continuing need to readily, and economically stuff the casings without damage or breakage thereof, and more importantly, to permit the stuffing of a given casing to its manufacturer's recommended fully stuffed size with consistent accuracy and reproducibility of results (size uniformity).

A commercially practiced solution to the moisture problem is for the casing manufacturer to premoisturize the casing prior to shirring and/or stuffing so that the casing contains preferably between about 17% and 35% by weight of water based on the total fibrous casing weight. It may then be shirred or reeled in the flat form in the "no soak" form, ready for stuffing. Also, to prevent mold growth in the cellulosic fibrous casing during storage of the casing, an antimycotic agent such as propylene glycol is incorporated into the casing. As, for example, described in copending application Ser. No. 157,008 of Ellis et al, said application being assigned to the same assignee as the instant application, propylene glycol is provided in an amount of at least about 4% by weight of dry cellulose and also sufficient to comprise at least about 5% by weight of the liquid components in the casing.

An object of this invention is to provide a liquid smoke impregnated fibrous reinforced cellulosic food casing article which has sufficient antimycotic quality to be free of mold growth, but without the use of an agent added only for antimycotic action, i.e., in situ antimycotic capability.

Another object is to provide such an article with in situ antimycotic capability and which also has sufficient moisture content to permit subsequent use in food processing without the need for additional moisturizing.

A further object is to provide a liquid smoke impregnated fibrous reinforced cellulose food casing article with in situ antimycotic capability, substantial moisture content, and an optimum liquid smoke loading to impart a characteristic dark smoke color to the outer surface of encased food, while maintaining acceptable smoke odor and flavor characteristics.

Other objects and advantages of the invention will become apparent from the ensuing disclosure and appended claims.

SUMMARY OF THE INVENTION

In this invention, a fibrous reinforced cellulosic food casing article is provided with a wood-derived liquid smoke including color, odor and flavor constituents, being impregnated in the casing wall. The impregnated liquid smoke is present in sufficient quantity to provide a casing having an absorptive index of at least about 0.15 at 340 nm. wave length antimycotic quality for the casing without a separate antimycotic agent, and a moisture content of between about 17 and about 60 percent of the total casing weight.

This article provides all of the aforedescribed objectives of the invention, i.e. in situ antimycotic capability, adequate moisture content to permit use of the casing in food processing without further moisturization, an optimum liquid smoke loading which is lower than heretofore considered necessary for imparting dark smoke color in the encased processed food.

DESCRIPTION OF PREFERRED EMBODIMENTS

Figure 1:
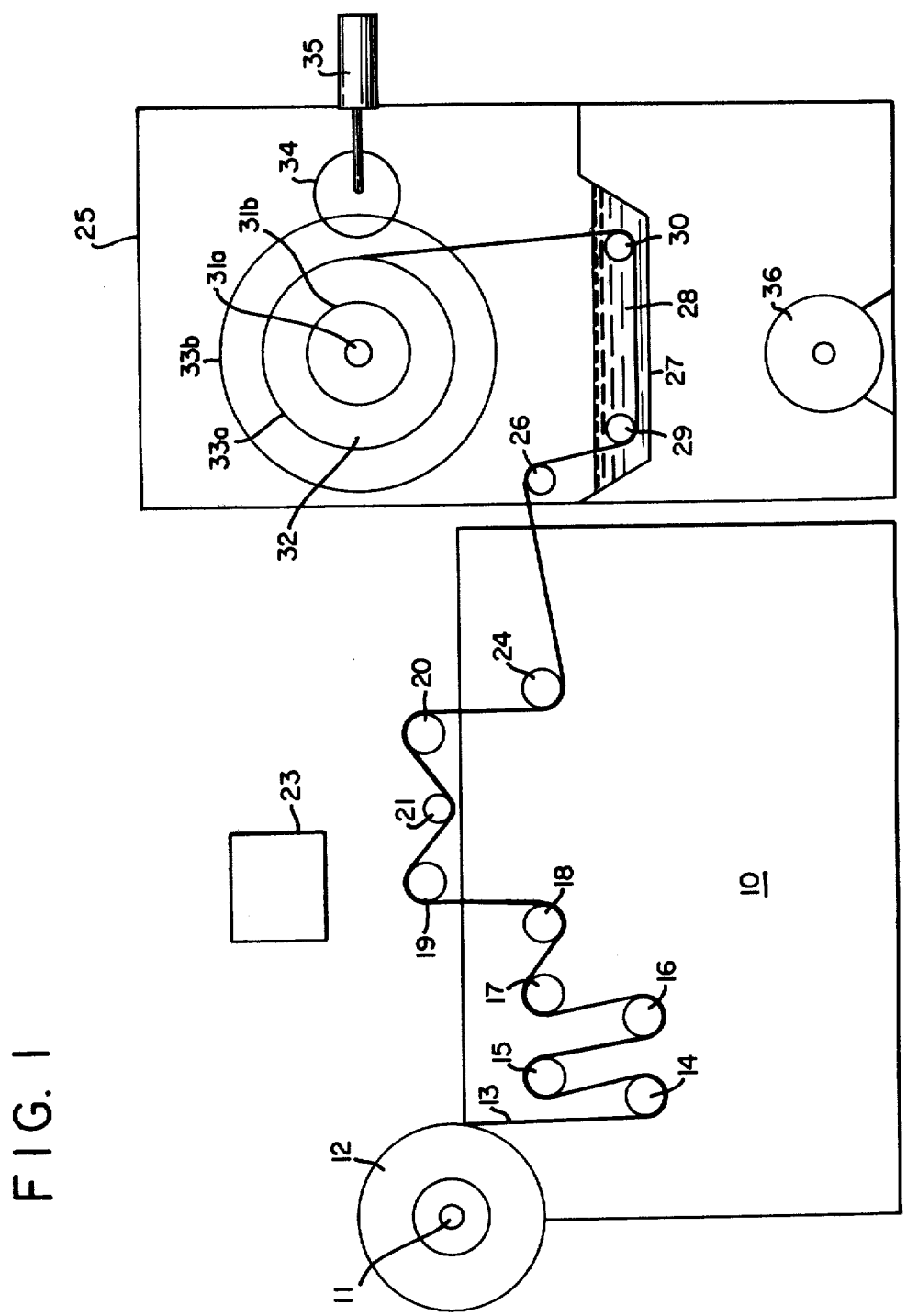
FIG. 1 is a schematic view of apparatus suitable for manufacturing the liquid smoke-impregnated fibrous cellulosic food casing article of this invention, using a liquid smoke dip tank as the coating zone.

Table A lists several commercially available tar-containing liquid wood smokes along with certain characteristics deemed important for purposes of this invention (discussed hereinafter). The apparatus and method for manufacturing typical liquid smokes of the preferred type is more fully described in U.S. Pat. No. 3,106,473 to Hollenbeck and U.S. Pat. No. 3,873,741 to Melcer et al.

In a preferred embodiment, the liquid smoke composition used in the practice of this invention has a total acid content of at least about 6 weight percent and most preferably a total acid content of at least about 9 weight percent. Total acid content is a qualitative measure of the tar content and staining capability of liquid wood smokes used by manufacturers. In general, higher total acid content means higher tar content. The same is true of the total solids content of liquid smoke. The procedures used by liquid wood smoke manufacturers to determine total acid content (total acidity) and total solids are as follows:

TABLE A

Commercially Available Liquid Wood Smokes

| Manufacturers Designation | Total Acid Content[d] % | Total Solid % |
|---|---|---|
| Royal Smoke AA[a] | 11.5–12.0 | 10.2 |
| Royal Smoke A[a] | 10.5–11.0 | 9.0 |
| Royal Smoke B[a] | 8.5–09.0 | 8.8 |
| Royal Smoke 16[a] | 10.0–10.5 | 17.6 |
| Charsol C-12[b] | 12.0–12.5 | 8.3 |
| Charsol C-10[b] | 11.5 | not reported |
| Charsol X-11[b] | 10.0 | 5.8 |
| Charsol C-6[b] | 6.7 | 4.8 |
| Charsol C-3[b] | 3.6 | 1.0 |
| Smokaroma | | |
| Code - 12[c] | 12.0 | 10.5 |
| Code - 10[c] | 10.2 | 5.1 |
| Code - S[c] | 8.0 | 2.4 |
| Code - 6[c] | 6.2 | 1.9 |

[a] Griffith Laboratories, Inc. 12200 South Central Avenue, Alsip, IL
[b] Red Arrow Products Co., P.O. Box 507, Manitowoc, WI
[c] Meat Industry Suppliers, Inc. 770 Frontage Road, Northfield, IL
[d] Also referred to as "Total Acidity"

DETERMINATION OF TOTAL ACID CONTENT FOR LIQUID SMOKE

1. Weigh accurately about 1 ml. of liquid smoke (filtered if necessary) in a 250 ml. beaker.

2. Dilute with about 100 ml. of distilled water and titrate with standard 0.1 N NaOH to a pH of 8.15 (pH meter).

3. Calculate the total acid content as percent by weight of acetic acid, using the following conversion:

1 ml. 0.1000 N NaOH = 6.0 mg. HAc

DETERMINATION OF TOTAL SOLIDS

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.

2. Dry for two hours at 105° C. in a forced draft oven, or for 16 hours at 105° C. in a conventional oven.

3. Cool to room temperature in a desiccator and weigh.

4. Calculate the total solids as percent by weight of the liquid smoke.

The liquid smoke used in the method of this invention may also contain other ingredients which may be suitably used in treating a tubular food casing, to which the smoke constituents are applied, e.g. glycerine which may be used as a softening agent. As previously explained, no separate antimycotic agent is required. It is however contemplated that certain ingredients such as propylene glycol added for another purpose, e.g. as a softening agent, may also have antimycotic capability.

Other ingredients which are normally used in the manufacture of, or for further treatment of the food casings, e.g., peelability agents and mineral oil, may also be present if desired.

In particular, agents for improving the peelability of the fibrous casings from food products such as hams and sausages, e.g., beef rolls, turkey rolls, bolognas and the like, may be optionally coated on the internal surface of the casings before or after the external liquid smoke treatment method of this invention and before or during shirring. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et al., the disclosure of which is incorporated herein by reference; "Aquapel", a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon", an E. I. duPont de Nemours Co., Inc. trademarked product comprising fatty acid chromyl chlorides, the use of which is further disclosed in U.S. Pat. No. 2,901,358 issued Aug. 25, 1959 to W. F. Underwood et al., the disclosure of which is incorporated herein by reference.

The peelability enhancing agent may be applied to the internal surface of the tubular fibrous casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the fibrous casing through a hollow mandrel over which the casing is advancing as, for example, a shirring machine mandrel in a manner similar to that described in U.S. Pat. No. 3,451,827 to Bridgeford.

It should also be recognized that the liquid smoke impregnated fibrous casing article of this invention may be printed with an insignia, trademark or lettering, as for example described in U.S. Pat. No. 3,316,189, the disclosure of which is incorporated herein by reference.

As previously explained, sufficient liquid smoke is impregnated into the fibrous casing to provide an absorptive index of at least about 0.15, preferably at least about 0.4 and most preferably between aout 0.4 and about 1.0. For particularly dark color, the impregnated casing preferably has an absorptive index of at least 1.5. "Absorptive index" is a measure of the casing's ability to impart smoke color to encased foodstuff, and for purposes of this invention is determined by the following procedure:

ABSORPTIVE INDEX

Two square inches of liquid smoke-treated fibrous casing are placed in 10 ml. of methanol. After one hour of soaking time, the methanol has extracted all of the smoke components out of the casing, and the ultraviolet absorption value of the resulting smoke component-containing methanol is determined at 340 nm. This value is defined as the absorptive index of the casing. A 340 nm. wave length was selected because spectroscopy measurements with many liquid smoke extracts from smoke treated casings indicate greatest correlation with smoke loading in this region.

It has been unexpectedly discovered that liquid smoke is such an effective antimycotic agent that it can prevent mold growth in a high moisture content premoisturized casing. This means that when high moisture contents of up to full saturation, i.e. up to about 60% by weight of water in the total casing weight, are desired for subsequent processing, these high moisture concentrations may be employed using the liquid smoke impregnated casing of this invention, without fear of mold growth during handling and storage. To attain desired high levels of moisture in the casing at low smoke color levels for the encased foodstuff, a commercially available liquid smoke solution containing a low total acid content and a low total solids content should preferably be used. The reason for this preference of using a commercial smoke having a low acid content, is the discovery that when a liquid smoke solution containing high total acid and high total solids is diluted with additional water, precipitation of tars from the aqueous liquid smoke solution occurs. Precipitation of tars should be avoided. Additionally, when a very high moisture level is desired, it may be advantageous to prestick the fibrous casing before the casing is impregnated with liquid smoke. The resulting prestuck holes allow the aqueous liquid smoke to enter the inside of the fibrous casing (in the flattened condition if coated by the FIG. 1 system). The moisture level is thus raised, as a portion of the liquid smoke is in contact with the inner surface of the casing wall. A preferred method of presticking is disclosed in U.S. Pat. No. 3,779,285 to Sinibaldo.

EXAMPLE I

A series of tests was performed to demonstrate the antimycotic action of liquid smoke impregnated at various loading levels in the wall of casings having various moisture contents. The general procedure was to prepare a mixture of viable molds and apply same on the liquid smoke-impregnated casing surface, and also on the surface of control samples of casing without liquid smoke impregnation. The samples were then stored in stoppered test tubes at predetermined relative humidities by suspension above a specific saturated aqueous salt solution. Selection of the specific salt provided a basis for predetermining the casing moisture, i.e. by relation of the casing moisture to the equilibrium relative humidity above the saturated salt solution. After various storage periods, the casing sample was washed in a phosphate buffer solution and an aliquot of the resulting wash solution was plated on a mold growth medium (potato dextrose agar with 10% tartaric acid) and incubated for five days. After incubation, the number of viable molds appearing on the plate was counted and compared with the number of viable molds in the original sample. Mold counting was done by eye using a dark field Quebec Colony Viewer, Model 330, at 1.5 magnification, purchased from American Optical Company, Instrument Division, Buffalo, N.Y.

More specifically, twenty two viable molds were selected for the tests as being typical species present in the various commercial environments of cellulose casing production, food stuffing and processing. Another group of three viable molds was selected on the basis of their ability to grow on cellulose under reduced moisture conditions. The first mentioned twenty two molds are stored at the Food Science Institute, Union Carbide Corporation, Chicago, IL, where they have been growing for long periods, i.e. several years. They are listed in Table B by an internal identification number ("FPD number"), along with a tentative identification. Two molds are also listed in Table B by either their American Type Culture Collection number ("ATCC") or other named source identification.

TABLE B

| FPD Number | Mold Mixture Tentative Identification |
|---|---|
| $P_{2B}$ | Penicillium |
| $P_{2C}$ | No easily recognizable conidial state; may belong in *Mycelia Steriles* |
| $P_{2D}$ | Penicillium |
| $P_{2E}$ | Penicillium |
| $P_4$ | Trichoderms |
| $P_5$ | Paecilomyces |
| $P_9$ | Paecilomyces |
| $P_{11A}$ | Penicillium |
| $P_{11B}$ | Penicillium |
| $P_{12A}$ | Aspergillus |
| $P_{12B}$ | Penicillium |
| $S_1$ | Fusarium |
| $S_2$ | Penicillium |
| $S_3$ | Monocillium |
| $S_4$ | Penicillium |
| $S_5$ | Penicillium |
| $S_6$ | Penicillium |
| $R_1$ | Penicillium |
| $R_2$ | Penicillium |
| $R_3$ | Penicillium |
| $V_1$ | Penicillium |
| $V_2$ | Penicillium |
| | Penicillium (either $P_{2D}$ or $P_{12B}$) |
| | *Aspergillus glaucus* (source: T. LaBuza U. of Minnesota) |
| | *Aspergillus niger* ATCC 1004 |

Figure 3:
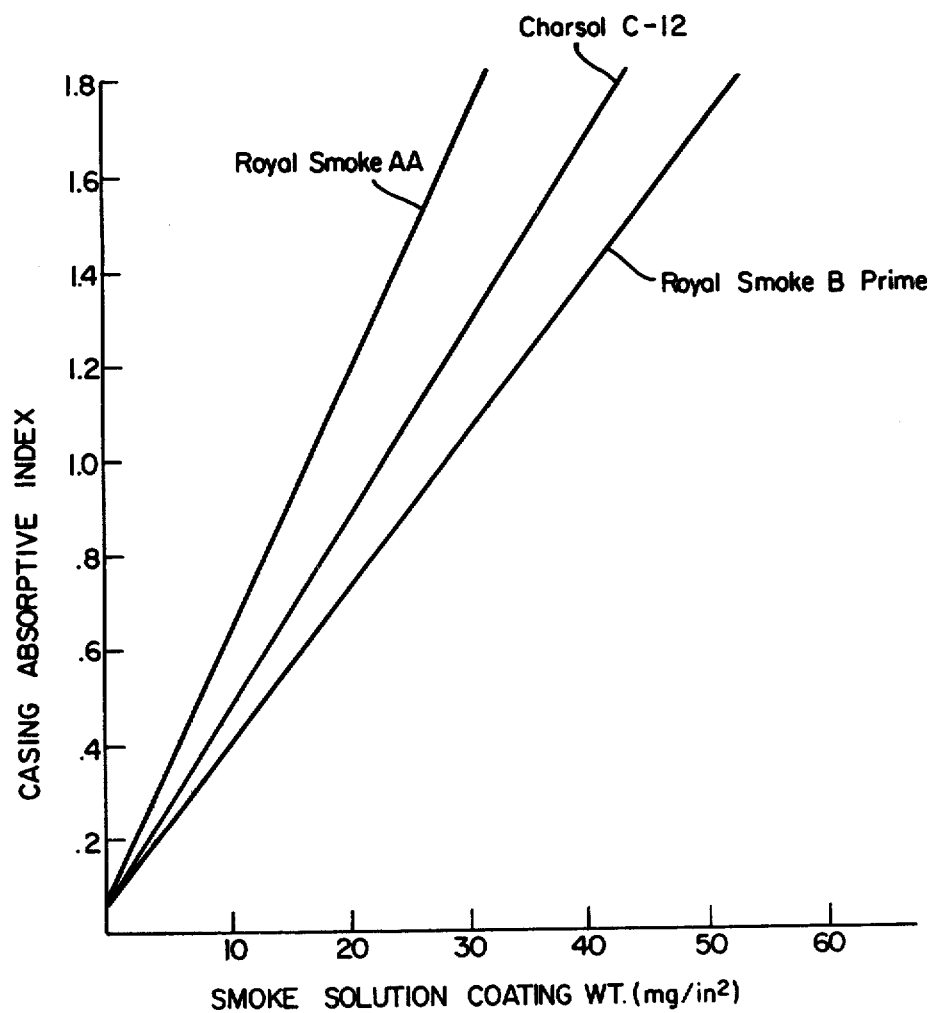
FIG. 3 is a graph showing the relationship between casing absorptive index and liquid smoke loading for three commercially available liquid smokes.

A series of liquid smoke-treated dry stock fibrous cellulosic casing samples was prepared with different smoke loadings and thus different UV absorbance values (absorptive index). Three different commercial grades of as-is tar-containing liquid smoke were used in solutions comprising 89 wt.% liquid smoke and 11 wt.% glycerine: Charsol C-6, Charsol C-12 and Royal Smoke B Prime. The casing had a dry flat width of 5.8 inches. Treatment was by immersing the untensioned casing external surface in a liquid smoke bath for a controlled contact time, and blotting off excess free liquid from the casing surface, and then measuring the UV absorbance of the liquid smoke-impregnated casing at 340 nm. (the absorptive index). The liquid smoke coating weights (milligrams of as-is liquid smoke solution per square inch of casing surface) were estimated from the absorptive index using previously developed calibration curves for each liquid smoke. FIG. 3 illustrates the relationship of absorptive index and liquid smoke loading for three commercially available liquid smokes. (FIG. 3 is discussed more fully hereinafter.) The characteristics of eight different liquid smoke-impregnated casing samples are summarized in Table C.

TABLE C

Smoke-Treated Casings For Antimycotic Tests

| Sample No. | Type Liquid Smoke | Contact Time | Absorptive Index | Coating wt. mg/in$^2$ |
|---|---|---|---|---|
| control | none | 0 | 0 | 0 |
| 1 | Charsol C-12 | 30 sec. | 0.38 | 9.3 |
| 2 | Charsol C-12 | 2 min. | 0.62 | 15.3 |
| 3 | Charsol C-12 | 7 min. | 1.03 | 25.7 |
| 4 | Charsol C-12 | 20 min. | 1.40 | 34.8 |
| 5 | Charsol C-12 | 60 min. | 1.71 | 42.5 |
| 6 | Royal Smoke B Prime | 16 min. | 1.21 | 35.1 (29.5)[a] |
| 7 | Charsol C-12 | in/out[b] | 0.20 | 5.0 |

TABLE C-continued

Smoke-Treated Casings For Antimycotic Tests

| Sample No. | Type Liquid Smoke | Contact Time | Absorptive Index | Coating wt. mg/in² |
|---|---|---|---|---|
| 8 | Charsol C-6 | in/out[b] | 0.15 | (3.7)[a] |

[a] values in parenthesis are equivalent Charsol C-12 wts.
[b] very short contact time - about 2 seconds.

The Table B molds were mixed in about equal quantities in an initial concentration of 420,000/ml. liquid and then diluted with a phosphate buffer so that each 0.1 ml of mold solution contained 1,000 organisms. The 0.1 ml solution was pipetted under asceptic conditions onto pre-cut one-half inch wide samples of 0.003 inch thick dry stock fibrous cellulosic casing impregnated with liquid smoke, as listed in Table C. For comparison, the mold solution was also applied to casing control samples which had not been impregnated with liquid smoke. The mold solution-treated casing samples were then air dried under asceptic conditions in a laminar flow hood.

As previously indicated, different moisture contents were maintained for each casing type, and this was accomplished by means of saturated solutions of different salts. The casing moisture contents and salts are listed in Table D.

TABLE D

Salts For Casing Moisture Control

| Actual Casing Moisture Content[a] | Equilibrium RH at 30° C.[b] | Saturated Solution Used |
|---|---|---|
| 16.2 | 72 | Sodium chloride |
| 17.7 | 80 | Ammonium sulfate |
| 22.3 | 98 | Potassium chromate |
| 30.0 | 90 | Barium chloride |
| 33.7 | 92 | Potassium nitrate |
| 38.0 | 96 | Disodium phosphate |
| 47.1 | 100 | Deionized water |

[a] moisture content is % H₂O in total casing wt.
[b] RH is relative humidity

Figure 4:
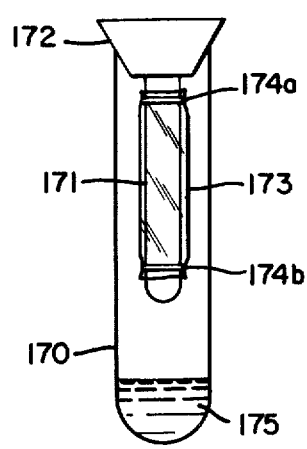
FIG. 4 is a schematic view taken in cross-sectional elevation, of the equipment used to control the enviroment (relative humidity) in tests used to demonstrate the antimycotic capability of the inventive article.

FIG. 4 illustrates the equipment used to maintain the controlled environment (relative humidity) for the antimycotic tests. The outer glass test tube 170 was 25 mm diameter×200 mm long, and an inner glass test tube 171 of 13 mm diameter×100 mm long was suspended inside from the rubber stopper 172. The casing strip sample 173 (½ inch wide×3 inches long) was positioned on the outer surface of the inner test tube 171 and held in place by rubber bands 174a and 174b. The saturated salt solution 175 (5 gms excess salt in 10 ml of saturated salt solution) was in the bottom of the outer test tube 170.

It should be understood that each casing sample of Table C, including the control, was evaluated in duplicate within each test environment tube to provide a set of such tubes for each of the seven relative humidities set forth in Table D. A plurality of such sets of tubes was prepared in order to allow the antimycotic effect of the smoke treatment to be checked at different time periods.

The first set of casing samples were removed from the test tubes after two weeks of storage at 30° C., and examined for number of viable molds. The results of the two week test are summarized in Table E.

TABLE E

Two Week Storage Of Smoked And Control Casing

| Actual Casing Moisture Content[a] | Visual Observation at 1.5× | Counts of Recovered Molds[b] |
|---|---|---|
| A: For Casing Samples Without Liquid Smoke Impregnation: | | |
| 16.2 | no visible growth | 4,6,7,6 |
| 17.5 | no visible growth | 3,6,4,5 |
| 22.3 | some visible growth | 15,11, none, 3 |
| 30.3 | abundant visible growth | too numerous to count |
| 33.7 | abundant visible growth | too numerous to count |
| 38.0 | abundant visible growth | too numerous to count |
| 47.1 | abundant visible growth | too numerous to count |
| B: For Casing Samples With Liquid Smoke Impregnation: | | |
| No consistent recovery of molds as determined by plating and examination of incubated plates at 1.5× magnification for all smoke-treated casings at all moisture percentages. | | |

[a] moisture content is % H₂O in total casing wt.
[b] counts from two replicate platings from each of two pieces of casing held at specified moisture percentage.

A second set of casing samples was removed from the test tubes after four weeks of storage at 30° C., and examined for number of viable molds. The results of the four week test are summarized in Table F.

TABLE F

Four Week Storage Of Smoked And Control Casing

| Actual Casing Moisture Content[a] | Visual Observation at 1.5× | Counts of Recovered Molds[b] |
|---|---|---|
| A: For Casing Samples Without Liquid Smoke Impregnation: | | |
| 16.2 | no visible growth | 0,0,0,1 |
| 17.5 | no visible growth | 0,0,0,0 |
| 22.3 | visible growth | too numerous to count |
| 30.3 | abundant visible growth | too numerous to count |
| 33.7 | abundant visible growth | too numerous to count |
| 38.0 | abundant visible growth | too numerous to count |
| 47.1 | abundant visible growth | too numerous to count |
| B: For Casing Samples With Liquid Smoke Impregnation: | | |
| No consistent recovery of molds as determined by plating and examination of incubated plates at 1.5× magnification for all smoke-treated casings at all moisture percentages. | | |

[a] moisture content is % H₂O in total casing wt.
[b] counts from two replicate platings from each of two pieces of casing held at specified moisture percentage.

It is to be noted from Tables E and F that both the two week antimycotic test and the four week test showed no consistent recovery of molds for any casing samples which has been treated with liquid smoke. These tests show that the liquid smoke had an antimycotic effect for all smoke treated casings at all moisture levels. It is concluded from these data that smoke treated casings will exhibit a resistance to mold growth during anticipated typical conditions of commercial handling and storage for all moistures up to about 50% and even higher.

The term "no consistent recovery of molds" means that no statistically significant appearance of molds occurred for casings which were impregnated with liquid smoke. Specifically for the two week test of Table E, five isolated molds were counted on individual plates out of a total of 224 plates which were evaluated. For the four week test of Table F, four isolated molds were counted on individual plates out of a total of 224 plates which were evaluated. These mold growths were randomly distributed and in no instance did a mold growth appearing in the two week test also appear in the four week test for the sme moisture level and liquid smoke loading. The random appearance of these isolated mold growths is considered to have no statistical significance, and it is believed that these isolated mold growths were the result of environmental contamination which occurred sometime during the period when the casing samples were removed from the environmental test tubes, when the casing samples were washed with phosphate buffer solution, and when the resulting wash solution was thereafter plated on the mold growth medium. Typically, such random contamination arises when a mold spore is picked up from the air. At any rate, it was concluded from the results of the two week test and the four week test that the liquid smoke in the casing had destroyed all molds with which the casing samples had been innoculated. Therefore, it may be safely concluded that a long term test would show the same results.

MANUFACTURING METHODS

The liquid smoke-fibrous cellulosic casing article of this invention is preferably prepared with commercially available rewinding machines modified to accept a single-dip liquid smoke application tank, along with certain internal modifications discussed hereinafter. FIG. 1 is a schematic representation of apparatus suitable for such practice. In particular, the modified rewind machine 10 includes first rotatable unwind shaft 11 with a roll 12 of fibrous reinforced dry stock cellulose food casing thereon in the flat reeled form. Flat stock casing roll 12 is engaged on first shaft 11 by well-known means, such as an air chuck (not illustrated).

Flat casing 13 is laced through the rewind machine 10 by pulling the first end of same under primary edge guidance roller 14, then over tachometer feedback roll 15 and then around the underside of tension dancer roll 16 positioned at about the same elevation as primary edge guidance roller 14. Next, the flat casing 13 is pulled over first idler roll 17 positioned at about the tachometer roll elevation, and thence under second idler roll 18 located at about the same elevation as first idler roll 17. Now the flat casing 13 is drawn upward for positioning over longitudinally spaced secondary edge guidance rollers 19 and 20, preferably at the same elevation. Tension sensing roll 21 with strain gauge sensors on each end is positioned intermediate the two guidance rollers 19 and 20 so as to downwardly displace the flat casing therebetween. The required first highest restraining torque is applied by an unwind brake coacting with unwind shaft 11 and controlled by a dancer roll-operated regulator (not shown) at the dancer roll 16. The tension on restrained flat casing 13 is sensed by means of the strain gauge sensors at roll 21 and the tension signal is transmitted to a tension readout means 23. Tension readout 23 is preferably a recorder device, since the recorder allows an average tension to be more easily determined.

The tensioned flat casing 13 is then transferred by third idler roll 24 into liquid containment enclosure 25 by movement over fourth idler roll 26.

Next, the tensioned flat casing web 13 is downwardly drawn into liquid smoke dip pan 27 by means of longitudinally spaced first dip roller 29 and second dip roller 30 which are at the same elevation. The tensioned flat casing outer surface is coated with liquid smoke therein as liquid smoke coating zone 28 and then upwardly withdrawn by engagement on second rotatable shaft 31a and roll core 31b, the latter being retained on shaft 31a by holding means such as an air chuck (not illustrated). During operation, a flat rewound second casing roll 32 forms thereon as a rewind zone, and side plates 33 are mounted on opposite ends of shaft 31 to provide edge guidance and alignment of succeeding casing layers. The flat casing contact (immersion) time in dip pan 27 is very shot, e.g. 0.2 second. It is less than that required for the liquid smoke to significantly impregnate the casing wall but sufficient for coating of the liquid smoke as an evenly distributed liquid film between adjacent layers of the second roll.

During the second roll rewinding and the first roll unwinding, the restraining torque applied by the unwind brake on unwind shaft 11 is progressively decreased to maintain constant web tension as the first roll diameter diminishes. Also, during this period the rewinding flat casing is maintained in the rewinding zone for sufficient duration for the liquid smoke film to impregnate the casing wall. By way of illustration, at a casing speed of 600 ft/minute and a roll length of 2400 feet, the minimum time for flat stock to remain on the second roll for substantial smoke absorption is about 5 minutes.

When the second or trailing end of the flat casing is released from first shaft 11, this untensioned end is pulled through liquid coating zone 28 and a liquid smoke film is formed thereon, after which this coated trailing end becomes the outer portion of the second rewind roll 32. Rider squeeze roll 34 is in edge-to-edge alignment with rewound flat casing roll 32, but in a retracted out-of-contact position during formation of second roll 32. Now it is moved by means 35 against the entire edge-to-edge outer surface of second roll 32. The purpose of rider squeeze roll 34 is to squeeze the remaining excess liquid smoke from the rewound flat casing outer layers. The second roll 32 is then slowly revolved in order to provide for liquid smoke to be evenly distributed throughout the layers of casing. As the reel continues to spin, the liquid smoke impregnates the wall of the casing. For this purpose, motor 36 is mechanically joined by unillustrated means (for example a shaft) to second shaft 31, and provides slow spin movement of liquid coated rewound casing second roll 32 simultaneously with rider squeeze roll 34 contact. During this liquid smoke absorption period, the second shaft speed may, for example, be about 50 to about 60 rpm.

Since the dip zone contact time of the tensioned flat casing is less than that required for the excess liquid smoke to penetrate into the casing wall, a portion of the excess liquid smoke descends in a falling film mode back into dip pan 27 from the rising tensioned flat casing web before it reaches rewound second roll 32. Another portion of the excess liquid smoke is allowed to drain from the spinning rewound flat casing roll 32 and spinning side plates 33a and 33b, each side plate having multiple radial drain passages for liquid smoke outward radial flow into dip pan 27. It is to be noted that the liquid level in dip pan 27 is held constant during the coating operation. The liquid smoke is recirculated by a conventional flow circuit and liquid smoke is added as needed. The aforedescribed short dip for liquid coating-tensioned reeling for liquid smoke absorption method is claimed in my contemporaneously filed patent application Ser. No. 301,276 incorporated herein by reference.

By way of illustration, the aforedescribed method has been successfully practiced to produce liquid smoke impregnated fibrous reinforced flat casings having dry flat widths in the range of about 2 to 12 inches using a modified Model 142 rewind machine purchased from the Stanford Division, Wood Industries, Salem Ill., as schematically illustrated in FIG. 1. The actual modifications were in two major functional areas: the means to maintain constant tension on the flat casing as it moves through the liquid smoke coating zone to the rewind zone, and the means to provide the precise edge guidance needed to produce a reeled product with uniform liquid smoke loading. The details of these modifications are described in my previously referenced contemporaneously filed application (see "Related Applications").

Although the liquid smoke is preferably coated on and impregnated into the casing wall by the aforedescribed dip application method, other methods may be used. For example, the casing may be dipped in a conventional tank where absorption equilibrium is reached during travel of the flat casing therethrough. Because several minutes of casing surface-liquid smoke contact time are required for this operating mode, the tank dimensions would be substantially larger than the small and shallow tank which can be used with the preferred liquid smoke treatment method. Also, the FIG. 1 first unwind shaft 11—roll 12 assembly is not essential as long as one end of the flat casing is restrained so that the casing may be pulled under tension through the liquid smoke dip tank. For example, the dip tank may be positioned immediately downstream of the drier squeeze rolls at the discharge end of the casing manufacturing system.

Another suitable method for applying the liquid smoke to the casing external surface is by roll coating, i.e. printing a film of liquid smoke on at least one surface of a flattened casing with a roll such as an Anilox Roll. In such an operation the flattened casing may be coated on one side or on both sides. Still another method for applying the liquid smoke to the casing surface is by spraying the liquid onto at least one casing surface.

Each of the previously described liquid smoke impregnation methods involves external treatment of the casing surface. The treatment could also be internal, as for example by slugging.

A further possible method for applying the liquid smoke is internal spraying during shirring of the cellulosic fibrous casing into the stick form. A particular problem with this technique is avoidance of non-uniformity in the smoke coated shirred stick. Assuming the liquid smoke is uniformly applied, the uniform pattern could be disrupted because of the casing surface movement during shirring and stick compression. Also, there could probably be a serious environmental pollution problem because atomization of the smoke solution leads to smoke odor contamination of the working environment.

It is to be noted that the liquid smoke which is coated on the casing surface, whether externally coated or internally coated, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color gradation across the casing wall, with the smoke treated surface having a darker color than the surface on the opposite side of the casing wall.

It will be apparent from the foregoing that an important aspect of the liquid smoke coating process is the point where effective impregnation of the casing wall is to take place. There are two alternatives. Impregnation can occur where the casing is first contacted with the liquid smoke, or impregnation can occur subsequent to the initial contacting of the casing with the smoke, as for example, in the system previously described in detail and illustrated by FIG. 1. If for example, the complete liquid absorption is to be accomplished in a moving flat casing before rewinding, the apparatus must be arranged and constructed so as to provide sufficient casing travel and liquid contact time to enable full liquid smoke penetration to occur. This necessarily requires more bulky equipment as compared to the FIG. 1 system, even at slow casing travel speeds. Also, slow treatment speeds increase manufacturing costs. High treatment speeds such as 600 ft/min. of casing travel may be impractical if equilibrium-type liquid smoke absorption is desired at the point of liquid contact.

A further consideration in selection of a liquid smoke treatment technique is that the glycerine content of cellulosic casings tends to be leached out of the casing by the liquid smoke if the casing is immersed in a dip tank for a relatively long period. This is not a problem in the preferred FIG. 1 treatment method, because the contact time is insufficient for a substantial amount of glycerine leaching to occur. However, leaching is a problem when the cellulosic casing is immersed in a dip tank for significantly longer periods and in this instance makeup glycerine should be added to the dip tank to compensate for the leaching loss. The leaching problem was illustrated in a test wherein a 5.8 inch dry flat width cellulosic fibrous casing was immersed in a Charsol C-12 liquid smoke bath for various periods. Samples were removed after these immersion times, blotted and analyzed for both Charsol C-12 loading and glycerine content. The data from this test is summarized in Table G, and the extent of glycerine leaching will be recognized by comparison with an untreated fibrous cellulosic casing of the same type, having 36.0 wt.% glycerine, where wt.% is based upon the weight of dry cellulose.

TABLE G

| | Glycerine Leaching By Liquid Smoke | |
|---|---|---|
| Casing Immersion Time | Estimated Liquid Smoke Loading, mgs/in$^2$ | Glycerine Content In Treated Casing, wt. % |
| 30 sec. | 8 | 28.1 |
| 1 min. | 10 | 26.2 |
| 2 min. | 12 | 20.1 |
| 5 min. | 16 | 12.2 |

LIQUID SMOKE LOADING

I have discovered that the relationship between smoke color intensity of the outer surface of a foodstuff processed in liquid smoke-impregnated fibrous casings, and the smoke loading (or casing absorptive index) is not linear. This is borne out by a Color Panel of individual persons who inspected the surfaces of hams and bolognas which were processed in the smoke-treated casings of this invention at various loadings of liquid smoke in the casings. It was found that the smoke color intensity increases rapidly at very low smoke loading and absorptive index up to an absorptive index value of about 0.15. At higher absorptive index values the smoke color intensity increases at significantly lower rates. This means that the practitioner may obtain substantial smoke color on processed food surfaces by using relatively low liquid smoke loadings corresponding to absorptive index values of at least about 0.15 to about 1.5. If deeper smoke color is required, much higher liquid smoke loadings must be employed which provide higher absorptive index values of 1.5 and above. Accordingly, a preferred embodiment of the liquid smoke-impregnated fibrous casing article of this invention has sufficient liquid smoke loaded therein to provide an absorptive index of between about 0.4 and about 1.0. This particularly preferred range of 0.4 to 1.0 for the absorptive index has been selected because the color is more controllably achieved with reproducible results when casings are used which have smoke loadings sufficient to provide absorptive indices in this range.

Those skilled in the art can readily determine the amount of liquid smoke loading, in mg. of liquid smoke solution per square inch of casing surface, required to achieve a desired absorptive index by using a calibration such as provided in FIG. 3. FIG. 3 shows the absorptive index which is obtained at various smoke loadings for three commercially available liquid smoke solutions. If the practitioner wishes to use a different aqueous liquid smoke solution, he may construct his own calibration curve for that specific smoke solution.

EXAMPLE II

A series of tests was performed to compare the characteristics of foodstuff processed in: (a) the tar-containing liquid smoke impregnated casings of this invention, (b) casings without smoke treatment, (c) casings impregnated with tar-depleted liquid smoke, and (d) a conventional smokehouse where the casing was subjected to actual contact with liquid or gaseous wood smoke during processing, as commercially practiced. In particular, bologna and ham products were evaluated for surface color, peelability, and problems with uneven surface coloration beneath the printed logo on the casing. Also, odor acceptability for each casing type was rated before and during stuffing. (It is to be noted, that the casings impregnated with tar-depleted liquid smoke are a separate invention of mine, said invention being disclosed in my copending application, Ser. No. 312,364, entitles "Tar-depleted Liquid Smoke and Treated Food Casings".)

The casing used in these tests was the cellulosic fibrous reinforced type, and it had a dry flat width of 6.5 inches. All casings were internally coated with a solution containing an agent for improved peelability of the casing from the processed foodstuff.

This internal coating was performed before liquid smoke impregnation of the external surface, and the improved peelability agent was "Quilon", an E. I. duPont de Nemours Co. trademarked product comprising fatty acid chromyl chlorides. The improved peelability agent was applied in accordance with the teachings of Underwood et al U.S. Pat. No. 2,901,358, the disclosure of which is incorporated by reference. The liquid smoke used in these tests was Royal Smoke AA liquid smoke, and the same was impregnated in the casings at various loadings.

All casings were prestuck, i.e. small holes were pierced in the casing wall to permit elimination of air and fat pockets during processing of the foodstuff.

Eight casing samples were prepared as described in Table H. Sample Nos. 1, 2, and 5 are embodiments of this invention (casings impregnated with tar-containing liquid smoke). In addition, Sample Nos. 3 and 4 are casings impregnated with liquid smoke in which the tar content had been depleted to a low level. Sample 6 is the control casing sample without smoke treatment. Sample 7 was treated with tar-containing liquid smoke during food processing, by rotating the stuffed encased raw meat in a pan of Royal Smoke AA liquid smoke for 15 seconds. Sample 8 was treated with gaseous wood smoke during food processing.

The formulation for bologna used in these tests is listed in Table I. For the ham tests, whole boneless material was trimmed of excess fat and then pumped to 30% added weight with curing pickle of the Table J composition. The whole boneless material was then cut into chunks for stuffing.

TABLE H

| Bologna Formulation | |
|---|---|
| COMPONENT | AMOUNT |
| Regular Pork Trim | 50.0 lbs. |
| Beef Chuck | 50.0 lbs |
| Water | 25.0 lbs |
| Salt | 2.5 lbs. |
| Prague Powder | 4 oz. |
| Sodium Erythorbate | 1 oz. |
| Griffith's Bologna Seasoning | 8 oz. |
| Garlic | 1 oz. |

TABLE I

| | | Stuffing Tests - Peelability And Odor | | | | |
|---|---|---|---|---|---|---|
| | | Smoke Loading | Peelability$^a$ | | | Comments on Odor |
| Sample No. | Smoke Type | (mg/in$^2$) | Bologna | Ham | Odor Test$^b$ | During Stuffing |
| 1 | Tar-containing liquid | 20 | 1.25 | 1.0 | 7.7 ± 1.8a | Similar to No. 4 |
| 2 | Tar-containing liquid | 17 | 2.25 | 2.0 | 7.2 ± 2.3a | Strong odor |
| 3 | Tar-depleted liquid | 24 | 1.00 | 1.5 | 6.0 ± 2.5a | Medium odor |
| 4 | Tar-depleted liquid (pH of 5.0) | 44 | 1.75 | 3.0 | 8.0 ± 2.5a | Slight odor |
| 5 | Tar-containing liquid | 30 | 1.0 | 1.0 | 7.8 ± 2.1a | Very strong odor |
| 6 | No smoke | | 1.0 | 1.0 | 1.0 ± 0.0b | No odor |
| 7 | Liquid smoke | | 1.0 | 1.0 | | |
| 8 | Gaseous Smoke | | 1.0 | 1.5 | | |

$^a$Peelability scale: 1 = excellent, 5 = poor
$^b$1–10 scale used; 1 = no smoke odor, 10 = high smoke odor. Means not bearing the same subscript are significantly different at P .01 level by Duncan's Multiple Range Test

TABLE J

| Curing Pickle Formulation | |
|---|---|
| COMPONENT | WEIGHT % |
| Water | 87.64 |
| Salt | 8.07 |
| Sucrose | 2.20 |
| Sodium Phosphate | 1.83 |
| Sodium Erythorbate | 0.20 |
| Sodium Nitrite | .057 |

The stuffing equipment comprised a VEMAG Model 3000 S vacuum stuffer, manufactured and marketed by Robert Reiser Company, Inc. of Boston, Mass., and a SHIRMATIC Model 400 F Precision Sizer manufactured and marketed by Union Carbide Corporation of New York City. Diameters, breakage, odor assessment and handling characteristics were recorded during stuffing.

For thermal processing, the encased ham and bologna were placed in the same smokehouse chamber. One such chamber was used for Samples 1-6, since no smoke was separately added for any of these samples. The temperature cycle used included a temperature elevation from 140° to 180° F. over a one hour period, and the foodstuffs were thereafter maintained at 180° F. until an internal product temperature of 155° F. was reached. The relative humidity was held at 30% throughout the cycle and the total cook time was six hours. The processed foodstuffs were showered for one hour with cold water and allowed to plump for one hour at room temperature prior to chilling with cold water (40° F.). Samples 7 and 8 involved processing in a liquid and gaseous wood smoke environment respectively, so they were placed in another smokehouse chamber for exposure to the same thermal conditions as the first mentioned group of samples. Initially, only Sample 8 was placed in the chamber and treated with gaseous wood smoke for 7-10 minutes at a temperature in excess of 140° F. The gaseous smoke was generated at 750° F. with a Kartridge Pak Generator System (wood chip feed setting at 7) manufactured by kartridge Pak Company of Davenport, Iowa. Then Sample 7 (previously given a 15-second dip in Royal Smoke AA liquid smoke), was added to the chamber containing Sample 8. Then both Samples 7 to 8 were processed at the same conditions under which Samples 1-6 were processed.

The results of these tests are summarized in Tables H, K, and L.

The subjective casing odor test (Table H) involved a panel of several persons, and indicated no significant difference in the odor of shirred casings between the various samples of smoke impregnated casing. A subjective evaluation of the odor during stuffing of the casings also appears in Table H. This evaluation was made by the stuffing machine operator.

After the encased foodstuffs were processed, the finished encased products were evaluated for surface color. This evaluation was made by a color panel of eight persons who individually assessed color uniformity and color acceptability. The casings were thereafter peeled from the meat products and the color panel then evaluated the peeled meat products for color uniformity and acceptability on the meat surface. The results of the color panel evaluation are given in Tables K and L. The casings were peeled from the processed products and rated for peelability on a 1-5 scale (1=excellent; 5=poor.). This peelability data (summarized in Table H), indicates that both ham and bologna products processed in casing article of this invention had good to excellent peelability. After peeling, non-uniform surface coloration beneath the logo was apparent on all pieces of ham and bologna from printed casing. However, because the liquid and gaseous smoke treated control samples also showed at least equivalent non-uniformity of color beneath the logo, it was concluded that the foodstuffs processing in the smoke impregnated casing article of this invention were as acceptable as those processed in the control casing.

The results for bologna and ham color panel evaluations made before and after peeling the casings from the foodstuffs are shown in Tables K and L. Color acceptability for ham and bologna processed in the smoke treated casings of this invention was consistently good (samples 1-5). Sample 5 was prestuck before the casing was treated with liquid smoke, and liquid smoke entered the interior of the flattened casing through the presticking holes, thereby producing localized higher smoke color concentration on the surface of the foodstuffs in the regions of the presticking holes. This accounts for the lower acceptability of Sample 5. Sample 6 had a poor color acceptability since the foodstuffs produced in the casing of Sample 6 were not treated with smoke in any form. Samples 7 and 8 had good color acceptability since Sample 7 foodstuffs were treated with liquid smoke and Sample 8 foodstuffs were treated with gaseous smoke. Exposure to light did not change the colorimetric relationship of the various samples, suggesting that all faded at comparable rates.

TABLE K

Bologna Stuffing Tests - Surface Color[1] Panel Ratings*

| | Casing On | | | Casing Off | | |
|---|---|---|---|---|---|---|
| Sample No. | Color Uniformity | Color Intensity | Overall Acceptability | Color Uniformity | Color Intensity | Overall Acceptability |
| 1 | 4.5 ± 1.3ab | 4.5 ± 0.6ba | 4.5 ± 1.0ab | 5.2 ± 0.8a | 4.0 ± 1.3bc | 4.8 ± 1.2b |
| 2 | 3.5 ± 1.0bc | 5.0 ± 0.8b | 4.0 ± 1.8ab | 4.0 ± 0.9a | 4.3 ± 1.2bc | 4.8 ± 0.4b |
| 3 | 4.5 ± 0.6ab | 3.5 ± 0.6d | 4.3 ± 0.5ab | 4.7 ± 1.2a | 4.3 ± 1.2bc | 4.8 ± 0.8b |
| 4 | 5.0 ± 0.8a | 2.8 ± 0.5e | 4.0 ± 1.4ab | 5.2 ± 0.4a | 3.7 ± 0.5b | 3.8 ± 0.8bc |
| 5 | 2.3 ± 1.0c | 5.5 ± 0.6a | 3.0 ± 2.0bc | 2.2 ± 1.6b | 5.0 ± 0.6ab | 3.3 ± 1.4c |
| 6 | 5.3 ± 1.5a | 1.0 ± 0.0f | 1.5 ± 1.0c | 3.8 ± 1.8b | 1.7 ± 0.8c | 1.5 ± 0.8d |
| 7 | 2.5 ± 1.3c | 4.0 ± 0.8cd | 3.8 ± 1.5ab | 4.0 ± 1.7a | 5.0 ± 0.6ab | 4.2 ± 0.8bc |
| 8 | 3.3 ± 2.1bc | 3.8 ± 1.0cd | 3.5 ± 1.3ab | 5.7 ± 0.5a | 5.7 ± 0.8a | 5.2 ± 0.4a |

*Surface color panel rating scale: 1 = poor, 6 = excellent.
[1]Means within columns bearing the same subscript are not significantly different at the P < .05 level according to Duncan's Multiple Range Test - Reference:
Duncan, D. B., "Multiple Range and Multiple F. Tests", Statistics Symposium Program, Division of Industrial and Engineering Chemistry, 124th National Mtg., American Chemical Society, Chicago, September, 1953.

TABLE L

Ham Stuffing Tests - Surface Color Panel[1] Ratings*

| | Casing On | | | Casing Off | | |
|---|---|---|---|---|---|---|
| Sample No. | Color Uniformity | Color Intensity | Overall Acceptability | Color Uniformity | Color Intensity | Overall Acceptability |
| 1 | 5.3 ± 0.5a | 4.8 ± 0.5a | 5.3 ± 0.5ab | 4.5 ± 1.6abc | 3.7 ± 1.0b | 4.3 ± 1.2bc |
| 2 | 4.5 ± 0.6a | 5.0 ± 0.8a | 5.0 ± 1.4b | 4.8 ± 1.6abc | 4.0 ± 1.1b | 4.3 ± 1.2bc |
| 3 | 4.8 ± 0.5a | 3.8 ± 0.5b | 4.5 ± 1.0bc | 4.3 ± 1.2bc | 3.8 ± 0.8b | 4.2 ± 1.0bc |
| 4 | 4.0 ± 1.8a | 3.0 ± 0.0bc | 3.3 ± 0.5c | 4.8 ± 1.3abc | 4.2 ± 0.8bc | 4.3 ± 0.5bc |
| 5 | 4.0 ± 1.2a | 5.8 ± 0.5a | 4.5 ± 1.9bc | 3.8 ± 1.6c | 3.7 ± 1.4c | 3.5 ± 0.8c |

TABLE L-continued

| | Ham Stuffing Tests - Surface Color Panel[1] Ratings* | | | | | |
|---|---|---|---|---|---|---|
| | Casing On | | | Casing Off | | |
| Sample No. | Color Uniformity | Color Intensity | Overall Acceptability | Color Uniformity | Color Intensity | Overall Acceptability |
| 6 | 4.8 ± 1.9a | 1.0 ± 0.0d | 1.3 ± 0.5d | 4.3 ± 1.8bc | 1.3 ± 0.5d | 1.5 ± 0.5d |
| 7 | 4.8 ± 1.3a | 2.8 ± 1.5c | 4.0 ± 0.8bc | 5.8 ± 0.4a | 5.3 ± 0.5ab | 5.5 ± 0.5a |
| 8 | 4.8 ± 1.3a | 2.5 ± 1.3c | 3.8 ± 1.0bc | 5.8 ± 0.4a | 5.8 ± 0.4a | 5.5 ± 0.5a |

*Surface color panel rating scale: 1 = poor, 6 = excellent.
[1]Means within columns bearing the same subscript are not significantly different at the $P < .05$ level according to Duncan's Multiple Range Test - Reference:
Duncan, D. B., "Multiple Range and Multiple F. Tests", Statistics Symposium Program, Division of Industrial and Engineering Chemistry, 124th National Mtg., American Chemical Society, Chicago, September, 1953.

The bologna samples produced in this example were evaluated for darkness and redness using a Gardner XL-23 Colorimeter with a 3.8 cm. aperture opening standardized with a white plate, all in accordance with the standard operating procedures described in the instruction manual for the Gardner XL-23 Tristimulus Colorimeter. This technique reports "L" values for darkness and "a" values for redness. While "L" values and "a" values are suitable in some applications for comparing darkness of foodstuffs processed in liquid smoke impregnated casings, such as frankfurters, it has been found that these colorimetric evaluations are not suitable for evaluating the surface coloration of darker products such as bologna. This is because at high levels of darkness, the Colorimeter discerns differences in darkness which are not discernable to the human eye. Similarly, the colorimetric evaluation of ham surfaces is not suitable since the ham surface is not uniform in color due to the presence of regions of fat. In this instance the human eye can more readily perceive any color differences in the overall ham surface which the colorimeter cannot discern. It is for these reasons that I have chosen to evaluate smoke color and darkness by using a panel of persons who make the color evaluations on a subjective basis. It is to be noted that the color panel is, in fact, more representative of what the consumer perceives to be an acceptable smoke color when he purchases ham or bologna.

EXAMPLE III

A series of tests was performed to demonstrate the boneless ham surface color achievable with various loadings of liquid smoke using the liquid smoke-impregnated casing article of this invention to encase the boneless ham during elevated temperature processing.

The casing was the fibrous reinforced cellulosic type, having a dry flat width of 7.6 inches. The liquid smoke used in this example was Charsol C-6 for the 3.6 mg/in² loading level and Charsol-12 for all the higher loading levels. An improved peelability solution containing the previously referenced "Quilon" was just applied to the casing inner surface by the slugging technique previously discussed. The liquid smoke was then applied to the casing outer surface by manually immersing the casing in the liquid smoke solution for various time periods and then blotting them dry. Whole boneless hams and sections thereof were stuffed in the liquid smoke impregnated casing using a SHIRMATIC Model 405-H Sizer manufactured and marketed by Union Carbide Corporation. The ham-stuffed casing was then subjected to conventional processing i.e. heating until the interior temperature of the hams reached 153° F. while maintaining a relative humidity of 35–40%, but without addition of smoke in the conventional manner. The casing was then peeled from the processed ham.

The various randomized samples were then visually examined by a color panel using nine laboratory personnel as judges. Judges were asked to rate each sample for external surface color intensity using a 6 point hedonic scale as shown below:

1. Extremely light
2. Moderately light
3. Slightly light
4. Slightly dark
5. Moderately dark
6. Extremely dark A non-smoked product was included in each test as a control. Data were collected and analyzed statistically to ascertain differences of significance. The results of these tests are summarized in Table M and in the FIG. 2 graph (solid line).

TABLE M

| Ham Coloration At Various Smoke Loadings | | | |
|---|---|---|---|
| Charsol C-12 Liquid Smoke Loading (mg/in²) | Immersion Time | Casing Absorptive Index | Color Intensity (Color Panel) |
| 0[a] | 0 | 0.00 | 1.3 |
| 0 | 0 | 0.00 | 1.7 |
| 3.6[b] | in/out | 0.15 | 3.2 |
| 7.8 | 20 sec. | 0.32 | 3.4 |
| 11.4 | 50 sec. | 0.47 | 3.7 |
| 22.9 | 4 min. | 0.95 | 4.4 |
| 39.3 | 17 min. | 1.62 | 5.1 |

Figure 2:
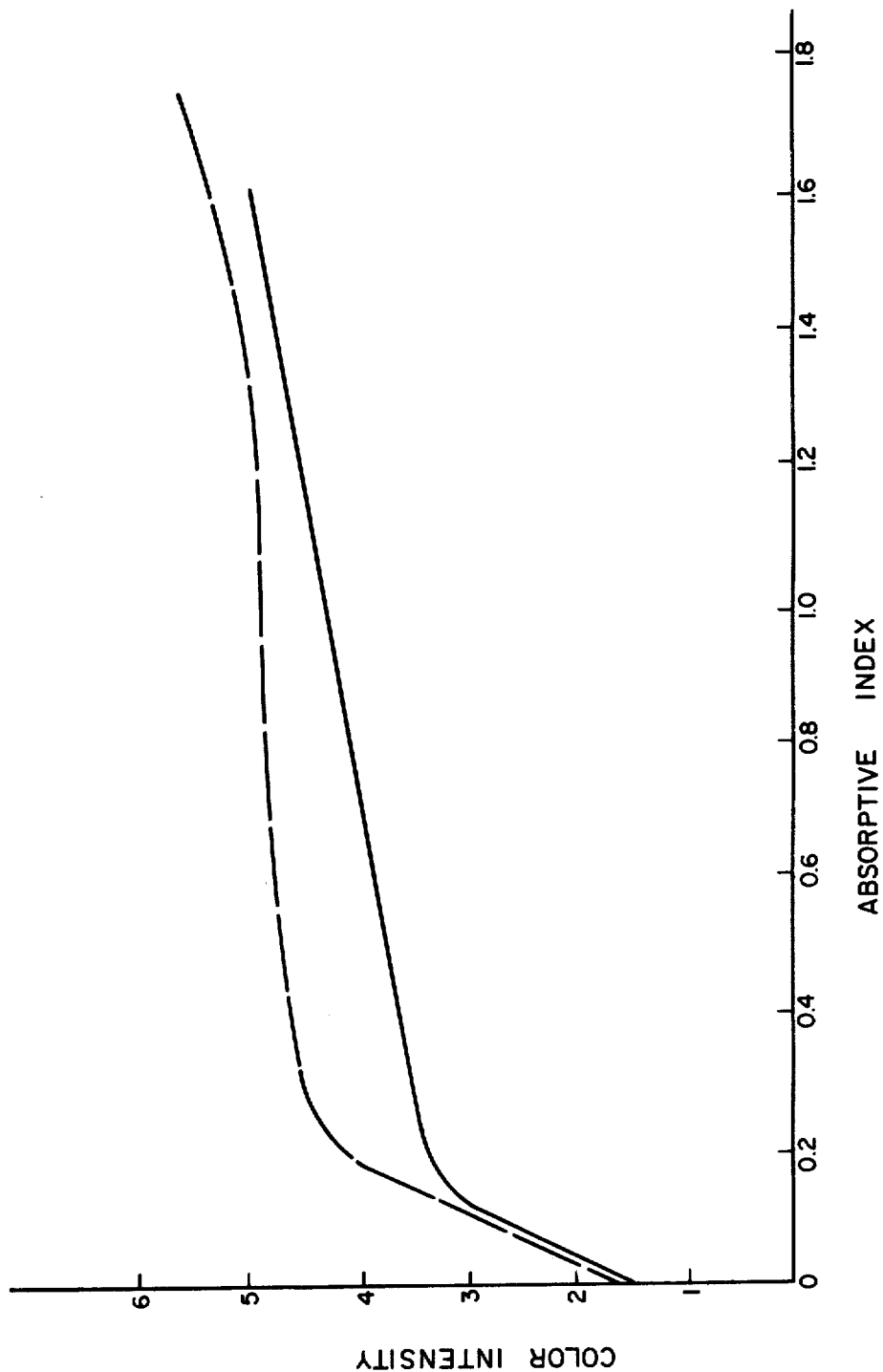
FIG. 2 is a graph showing smoke color intensity of whole hams (solid line) and bologna (dash line) processed in the liquid smoke impregnated casing of this invention, as a function of casing absorptive index.

[a]Only this control sample had an enhanced peelability coating in the casing interior.
[b]Converted to equivalent Charsol C-12 from actual Charsol C-6 loading The Table M data and the FIG. 2 graph (solid line) demonstrate a rapid increase in smoke color intensity for the processed whole ham outer surfaces from 1.7 to about 3 as the liquid smoke loading is increased from 0 to about 3.6 mg/in² and an absorptive index of about 0.15. Over this range, the slope of the whole ham color intensity curve in FIG. 2 is very steep. Wtih higher liquid smoke loadings up to at least 22.9 mg/in² and an absorptive index of about 1.0, the whole ham smoke color intensity increased slightly from about 3 to about 4.4. Over this range, the slope of the color intensity curve is very shallow. Analysis of the variance of smoke color, as evaluated by the Color Panel, illustrates that there is no real significant difference in color intensity over this range. At a liquid smoke loading of 39.3 mg/in² the color intensity is 5.1, which is significantly higher. However, this color intensity is still an acceptable color level. Accordingly, acceptable color intensity is achieved at smoke loadings of from about 3.6 to about 39.3 mg/in² of casing surface, which corresponds to casing absorptive indices of from about 0.15 to about 1.6.

EXAMPLE IV

Another series of tests was performed to demonstrate the bologna surface color achievable with various loadings of liquid smoke using the liquid smoke impregnated casing article of this invention to encase the bologna emulsion during elevated temperature processing.

The casing was the fibrous reinforced cellulosic type, having a dry flat width of 5.8 inches. An improved peelability solution containing the previously referenced "Quilon" was first applied to the casing inner surface. The liquid smoke was then applied to the casing outer surface by manually immersing the casing in the liquid smoke solution for various time periods, and blotting them dry. The liquid smoke used was Charsol C-6 for the 4.1 and 5.9 mg/in$^2$ loading levels, and Charsol C-12 was used for all the higher loading levels.

An emulsion of the bologna formulation of Table I was prepared and stuffed into the liquid smoke impregnated casing and into a control casing without liquid smoke impregnation, using a SHIRMATIC Model 400F Sizer.

The bologna emulsion-stuffed casing was then subjected to conventional processing, including a temperature elevation of from 140° to 180° F. external temperature until an internal temperature for the bologna product of 160° F. was reached. No smoke was added during this processing. After cooling, the casing was peeled from the processed bologna. The various samples were then visually examined by a Color Panel comprising seven of the same individuals used in the Example III Color Panel, and using the same 6 point hedonic scale. Data was collected and analyzed statistically to ascertain differences of significance. The analysis of variance in smoke color illustrated no real significant difference for smoke loadings in the range of from 5.9 mg/in$^2$ to 29.3 mg/in$^2$, corresponding to an absorptive index rate of 0.24 to 1.19. At a liquid smoke loading of 43.5 mg/in$^2$, the color intensity was 5.3, which is significantly higher. However, this color intensity is still an acceptable color level. Accordingly, acceptable color intensity is achieved at smoke loadings in this range using casings having absorptive indices in the range of from about 0.24 to about 1.77.

TABLE N

Bologna Coloration at Various Smoke Loadings

| Charsol C-12 Liquid Smoke Loading (mg/in$^2$) | Immersion Time | Casing Absorptive Index | Color Intensity (Color Panel) |
| --- | --- | --- | --- |
| 0 | 0 | 0.00 | 1.6 |
| 4.1$^{(a)}$ | in/out | 0.17 | 2.7 |
| 5.9$^{(a)}$ | 20 sec. | 0.24 | 4.7 |
| 9.5 | 10 sec. | 0.38 | 4.9 |
| 12.0 | 20 sec. | 0.49 | 4.7 |
| 13.8 | 30 sec. | 0.56 | 4.4 |
| 17.6 | 1 min. | 0.72 | 4.0 |
| 22.6 | 2 min. | 0.92 | 4.6 |
| 29.3 | 4 min. | 1.19 | 4.7 |
| 43.5 | 10 min. | 1.77 | 5.3 |

$^{(a)}$converted to equivalent Charsol C-12 from actual Charsol C-6 loading

The Table N data and the FIG. 2 graph (dash line) also demonstrate a rapid increase in smoke color intensity of the bologna foodstuff outer surface from about 1 to about 4.5 as the liquid smoke loading is increased from 0 to about 5.9 mg/in$^2$ and as the absorptive index correspondingly is increased from about zero to about 0.24. Over this range, the slope of the bologna color intensity curve in FIG. 2 is very steep. With higher liquid smoke loadings up to 29.3 mg/in$^2$ and with corresponding absorptive index values up to 1.19, the smoke color intensity only increases from about 4.7 to about 5.3. The bologna color intensity at very high loadings such as 43.5 mg/in$^2$ corresponding to an absorptive index of 1.77 is generally darker than desired by the normal marketplace, and the quantity of liquid smoke required to achieve this color intensity is substantial. Furthermore, casing treatment costs at this high loading of liquid smoke are considered to be prohibitive.

Although the relationship between foodstuff outer surface color intensity and liquid smoke loading of liquid smoke impregnated fibrous casings has only been demonstrated for processed whole ham and bologna, the same general relationship is believed to exist for other protein foodstuffs processed in the casing article.

The liquid smoke treatment of fibrous casing to prepare the article of this invention is preferably practiced under exceptionally clean controlled environmental conditions which are far more stringent than those normally employed in the preparation of a food manufacturing component. This is an important requirement since metal wear particles (primarily iron, copper, brass) in contact with the casing react with the liquid smoke coating, resulting in auto-oxidation and discoloration of the treated casing. The discoloration occurs only in the immediate area of the metal contamination and seldom exceeds 2-10 mm diameter in size. In addition to a clean environment, the materials of construction of the coating and rewinding system should be (1) of high wear resistance, and (2) nonreactive to the liquid smoke. It has been determined that certain metals and alloys are compatible with these stringent requirements. They are: certain aluminums, chrome plating, tin alloys, and hardened stainless steels. However, the primary solution to the metal contamination and discoloration problem is to manufacture the smoke treated casing in a dust-free environment. This means that all machines used in the manufacture must be free of metallic dust, not just the smoke coating and rewinding system, and that the casing must be handled and packaged in an environment free of metallic dust.

Although preferred embodiments of this invention have been described in detail, it is contemplated that modifications thereof may be made and some features may be employed without others, all within the spirit and scope of the invention. For example, my disclosure has dealt with aqueous solutions of smoke color, odor and flavor constituents. It is also within the scope of my invention to use nonaqueous solutions of such smoke constituents. Similarly, my disclosure includes a description of smoke treated casing where the casing includes an internal coating of a peelability agent. It is also within the scope of my invention to provide a smoke treated casing including an internal coating of an adhesion agent such as is used for dry sausages such as salami. A preferred adhesion agent is disclosed in U.S. Pat. No. 3,378,379 to E. A. Shiner. Additionally, it is within the scope of my invention to provide a smoke treated casing which has an external coating of a moisture proof film such as a barrier coating of a copolymer of polyvinylidene chloride.

Accordingly, the foregoing description of the present invention is to be taken as being illustrative and not in any sense of limitation, the limits of my invention being defined by the following claims:

What is claimed is:

1. A fibrous reinforced cellulosic food casing with a wood-derived liquid smoke having a total acid content of at least about 6 weight percent based on the weight of said liquid smoke including color, odor and flavor constituents, being impregnated in the casing wall, the impregnated liquid smoke being present in sufficient quantity to provide a casing absorptive index of at least about 0.15, said casing having a moisture content of between about 17 and about 60 percent of the total casing weight, with the impregnated liquid smoke providing antimycotic quality in said casing without a separate antimycotic agent.

2. A food casing article according to claim 1, in which said casing absorptive index is at least about 0.4.

3. A food casing article according to claim 1, in which said casing absorptive index is between about 0.4 and about 1.0.

4. A food casing article according to claim 1, in which said casing absorptive index is at least about 1.5.

5. A food casing article according to claim 1, in which the casing moisture content is between about 17 and about 50 percent of the total casing weight.

6. A food casing article according to claim 1, in which the casing moisture content is between about 17 and about 35 percent of the total casing weight.

7. A food casing article according to claim 6, in which the casing is shirred.

8. A food casing article according to claim 1 including an internal coating of a peelability agent.

9. A food casing article according to claim 1 including an internal coating of an adhesion agent.

10. A food casing article according to claim 1 including an external barrier coating.

11. A fibrous reinforced cellulosic food casing having antimycotic quality without the addition of a separate antimycotic agent, said casing having been prepared by the process comprising impregnating a wood-derived liquid smoke having a total acid content of at least about 6 weight percent based on the weight of said liquid smoke containing color, odor and flavor constituents in the wall of said casing, wherein said liquid smoke is present in sufficient quantity to provide an absorptive index of at least about 0.15 to said casing, and said casing contains a moisture content of between about 17 and about 60 percent by weight, based on the total weight of said casing.

12. A food casing prepared in accordance with claim 11 wherein the absorptive index of said casing is at least about 0.4.

13. A food casing prepared in accordance with claim 11 wherein the absorptive index of said casing is between about 0.4 and about 1.0.

14. A food casing prepared in accordance with claim 11 wherein the absorptive index of said casing is at least about 1.5.

15. A food casing prepared in accordance with claim 11 wherein said casing contains a moisture content of between about 17 and about 50 percent by weight, based on the total weight of said casing.

16. A food casing prepared in accordance with claim 11 wherein said casing contains a moisture content of between about 17 and about 35 percent by weight, based on the total weight of said casing.

17. A food casing prepared in accordance with claim 16 including the step of shirring said casing.

18. A food casing prepared in accordance with claim 11 including the step of coating a peel enhancing agent on the internal surface of said casing.

19. A food casing prepared in accordance with claim 11 including the step of coating an adhesion agent on the internal surface of said casing.

20. A food casing prepared in accordance with claim 11 including the step of applying a barrier coating on the external surface of said casing.

* * * * *